Feb. 28, 1933.  G. J. REGAS  1,899,721
SAFETY MECHANISM FOR AIRCRAFT
Filed Aug. 5, 1930    2 Sheets-Sheet 1
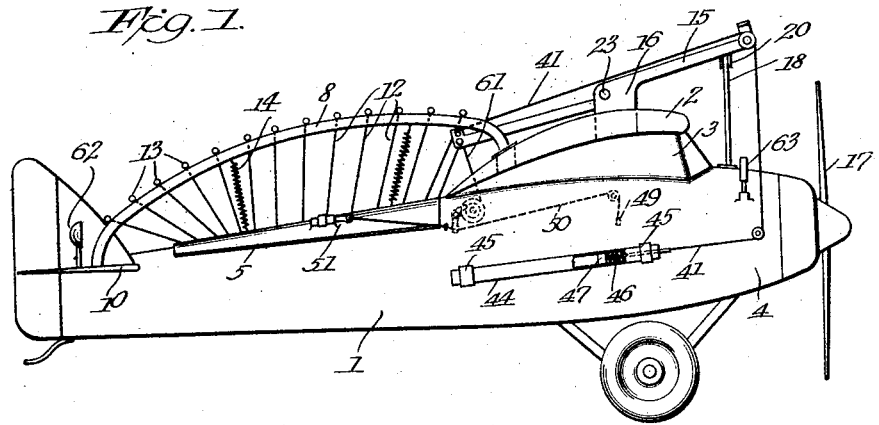
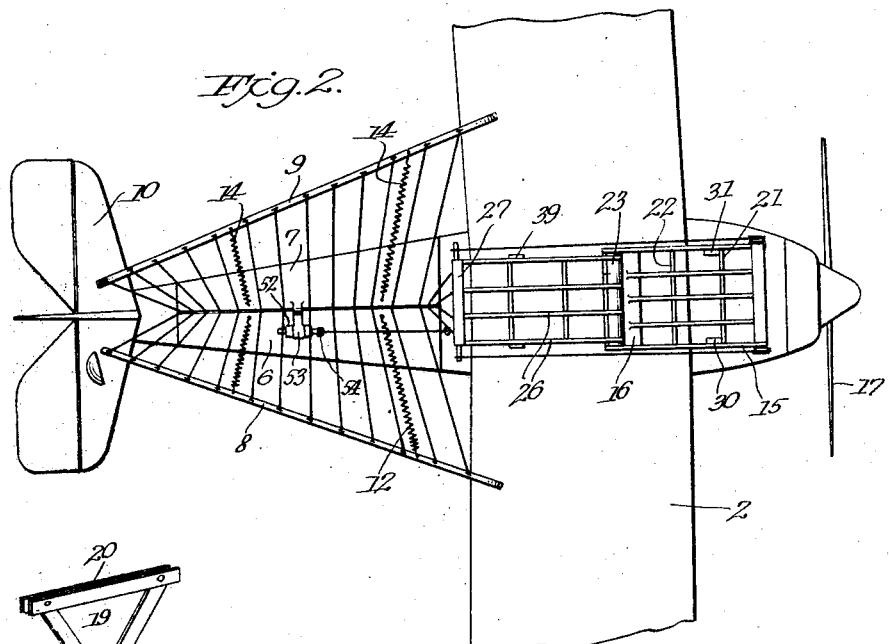
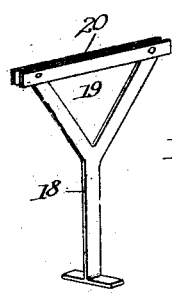
Inventor
George J. Regas
By Richard K. Stevens
Attorney Feb. 28, 1933.  G. J. REGAS  1,899,721
SAFETY MECHANISM FOR AIRCRAFT
Filed Aug. 5, 1930  2 Sheets-Sheet 2
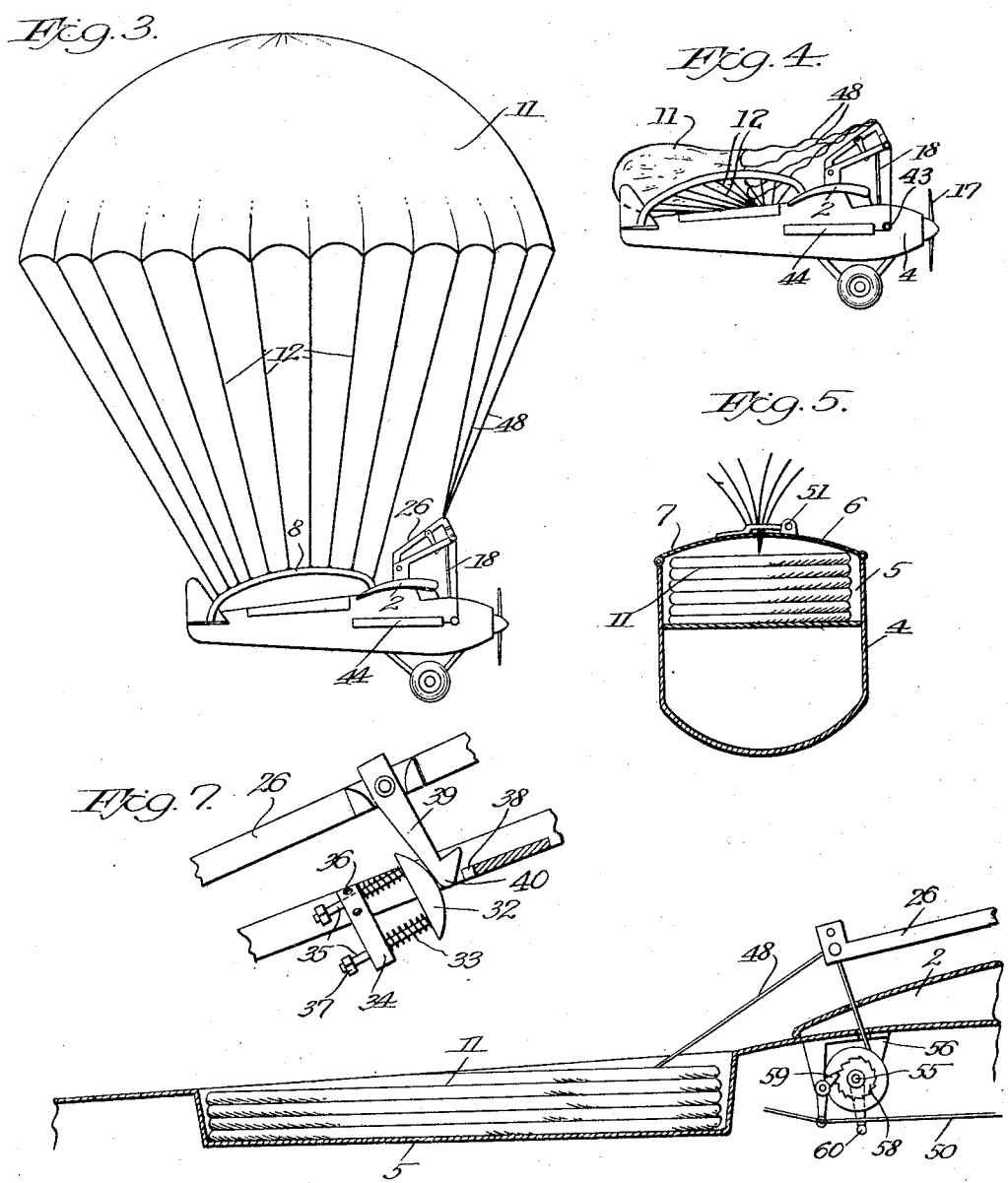

Patented Feb. 28, 1933

1,899,721

UNITED STATES PATENT OFFICE

GEORGE J. REGAS, OF WHEELING, WEST VIRGINIA

SAFETY MECHANISM FOR AIRCRAFT

Application filed August 5, 1930. Serial No. 473,230.

This invention relates to aeronautics, and more particularly to parachute construction, storage, and releasing mechanism for parachutes capable of retarding the fall or descent of the entire airplane.

For some years much study and work has been made with the view of constructing efficient and safe airplanes. The hazard of air travel has been recognized and many devices have been constructed with the view to permitting the occupants of airplanes to leave the same in case of disablement thereof, the occupants being permitted to descend by individual parachute constructions and the like. Such method of curtailing loss of life resulting from air travel has proven comparatively satisfactory because the occupants of airplanes in the past have largely consisted of persons skilled in the use of parachutes and similar safety devices.

During recent years air travel has become recognized as a quick and efficient means of transportation, and notwithstanding the necessary hazards to which the passengers are subjected, large passenger airplanes have been constructed and persons in every walk of life have adopted this means of travel to a material extent. However, transportation by air travel has not as yet reached those proportions which should normally be expected, due largely to the hazards to which the passengers are subjected, and the lack of skill in the use of parachutes and the like by the average traveler.

The present invention contemplates the provision of means for permitting the safe descent of airplanes or the like even though the power plant or other operating mechanism is disabled. It is an object of the invention to provide means for permitting the retarded descent of disabled airplanes without subjecting the passengers to substantial inconvenience.

The invention further contemplates a construction whereby the airplane may be suspended from a parachute with the weight evenly distributed whereby the airplane will be maintained in its normal horizontal position during descent.

An additional object of the invention is the provision of means for maintaining the parachute in a position where it is not subjected to the elements and where the operation of the same is entirely under the control of the pilot. It is still another object of the invention to provide a retaining, releasing and weight distributing mechanism for parachutes in which the vision of the pilot is substantially unobstructed and in which air resistance of the airplane is not unduly increased.

The invention also has an object the provision of means for dislodging a portion of the parachute to permit its subjection to air pressure for effecting the complete dislodgment of the parachute from its closed position and thereby retarding the descent of the airplane.

Other objects and advantages will be apparent from the following specification when considered in connection with the accompanying drawings wherein:—

Fig. 1 is a conventional showing of a side elevation of an airplane having the present invention applied thereto, Fig. 2 is a top plan view of the airplane illustrated in Fig. 1, Fig. 3 is a side elevation of the airplane with the parachute shown in operative position, Fig. 4 is a detailed view illustrating the means for dislodging a portion of the parachute to cause the air pressure to entirely dislodge the parachute from the inoperative or stored position, Fig. 5 is a transverse sectional view through the fuselage at the location of the parachute compartment, Fig. 6 is a detailed sectional view illustrating the parachute compartment and the mechanism for effecting a dislodgment thereof.

Figure 7 is an enlarged view of the latch mechanism that holds the pivot arm in place, Fig. 8 is an enlarged view of the member that supports the stationary portion of the parachute releasing means.

Now referring to the drawings in detail the numeral 1 indicates an airplane of conventional form, which is provided with wings 2. A cabin 3 is arranged under the wings adjacent the longitudinal center of the airplane, the cabin being formed within the fuselage or body 4.

A compartment 5 is arranged longitudinally within the upper rear portion of the fuselage directly to the rear of the wings and cabin, the compartment being closed by means of doors or covers 6 and 7 respectively. The doors 6 and 7 are hinged at their outer edges to the fuselage and have their free edges meeting when in closed position in such a manner as to cause the compartment to be waterproof when the doors are closed.

Arched bars 8 and 9 respectively are arranged to connect the wings at points adjacent the cabin, to the tail 10 at points slightly spaced from the fuselage, so as to form an outrigging to which a parachute 11 has its cables 12 secured. The cables 12 are of such length that when the parachute 11 is fully opened it will assume a position with respect to the airplane such as is indicated in Fig. 3. The outrigging formed by the bars 8 and 9 is narrowed toward the tail 10, due to the convergence of the bars in this direction and each of the bars is provided along its upper surface with rings 13 to which cables 12 are securely fixed and are thereby maintained in spaced position along the bars relative to each other.

The doors 6 and 7 are maintained under constant spring tension while in the closed position by means of springs 14 which normally tend to retract the free edges of the doors toward the bars 8 and 9 to thereby open the compartment 5 upon the release of latching mechanism to be hereinafter referred to.

A series of prongs 15 are rigidly mounted by a common base 16, upon the wings at the center of the plane, with extensions on the base extending through the wings and rigidly secured to the main framework structure of the fuselage. The free ends of the prongs extend upwardly and forwardly to a position slightly behind the plane of the propeller 17. A support 18 mounted directly behind the propeller on the fuselage and securely fixed thereto is provided with a bifurcated upper end 19 with the free ends of the bifurcations secured to a cross bar 20 lying directly under and connected to prongs 15 adjacent their free ends. The prongs 15 are further connected by means of cross bars 21 and 22 so that a rigid frame or grate is constructed substantially unobstructing the vision of the pilot, which framework is capable of supporting the forward end of the airplane while at the same time effecting a minimum of wind resistance. A shaft 23 is mounted in bars 24 and 25. Arranged in the base 16, which shaft has spaced thereon a series of bars or prongs 26 preferably corresponding in number to the prongs 15. The free ends of the prongs 26 are connected adjacent the end thereof by a cross bar 27, and cross bars 28 and 29 may be provided to form the prongs 26 into a rigid frame or grate. It will be seen by the construction thus described that the grate formed with the prongs 26 is capable of being drawn forwardly over the grate constructed of the prongs 15, and that upon the securing of the prongs 26 in the forward position to the prongs 15, a very strong construction will be had.

Latch mechanism 30 and 31 respectively is provided on both of the outer prongs 15, which latch mechanism is in the form of an arcuate segment or pressure guide 32 normally forced in a forwardly direction by means of springs 33 abutting against a corresponding segment 34. The two segments are secured together by means of rods 35 extending through the springs 33 and the segment is secured to the outside prongs 15 by means of screws 36. The movements to which the segments 32 may be subjected by the springs 33 is controlled by thumb nuts 37 screw-threaded upon the ends of rods 35 each of which ends extend through the corresponding segment 34. The cross bar 21 connecting the prongs 15 extends out slightly beyond the outer prongs and is provided with notches 38 in the ends thereof, the notches being in alignment with the paths of movement of the segments 32. Pivotally secured to the side prongs 26 of the pivoted frame are latches 39, which latches are adapted upon the forward motion of the pivoted frame to force segments 32 backwardly a sufficient distance to permit the enlarged ends 40 thereof to engage under the ends of the bar 21 by passing through the notches 38. When the latches 39 assume the position under the bar 21, the pressures upon the segments result in the latches being maintained securely in this position, and therefore the frame composed of the prongs 26 is securely held in the forward position and is capable of supporting the forward end of the airplane.

The release of the parachute 11 and the movement of the prongs 26 may be effected in any desired manner, and any desired latching means may be utilized to maintain the pivoted frame in the forward position so long as sufficient strength is had to permit the efficient operation of the invention, but it is preferred that the free end of the frame formed by the prongs 26 have cables 41 attached thereto which cables pass over corresponding pulleys 42 arranged at the sides of the forward ends of the prongs 15. Each cable extends downwardly along the side of the fuselage 4 over a pulley 43 and then rearwardly to a spring housing 44. Each spring housing is secured in position on the side of the fuselage by means of brackets 45. Arranged within each spring housing 44 is a spring 46 which is preferably normally contracted by means of a piston 47 having a bar extending through the spring, the free end of the bar being connected to the cable 41 so that during the time that the framework formed of the prongs 26 is maintained in the rearwardly position the cable will cause the spring to be maintained in its contracted position.

Cables 48 of the parachute 11 are connected to the prongs 26 and it will be seen that the portion of the parachute to which the cables 48 are connected will be the first portion to be dislodged upon the pivotal movement of the prongs 26.

Arranged within the cabin 3 is a lever 49 connected by means of a cable 50 to a latch mechanism 51 adapted for maintaining the covers or doors 6 and 7 in closed position. This latch may be of any desired form but it is preferably constructed with lugs 52, secured to door 6, having openings aligned with the opening of a pivoted member 53, secured to door 7, and with a pin 54 adapted to be inserted through the registering openings. Arranged preferably within the fuselage 4 at a point substantially below the free end of the frame formed of the prongs 26 when in the rearward position is a shaft 55 mounted in bearings such as 56 and 57 respectively, securely fastened to the framework. A ratchet 58 is secured to one end of the shaft 55 and the movement thereof is adapted to be controlled by a dog 59. The dog 59 is attached to the cable 50 whereby the movement of the lever 49 will effect the release of the latching mechanism 51 on the doors 6 and 7 and the disengagement of the dog 59 from the ratchet 58. The opposite end of the shaft 55 is squared for the reception of a crank handle 60, to permit the winding of a cable 61 thereupon, the cable 61 being attached to the grate formed of the prongs 26 for maintaining it in the rearward position against the tension of the springs 46. The construction may be such that the handle can be operated from the exterior of the fuselage or if desired, the handle may be constructed for inside operation.

In order to permit the pilot to determine the condition of the parachute mechanism during the night travel a light 62 may be provided on the tail 10 and through a series of mirrors 63 mounted on the fuselage and the wings respectively the mechanism can be viewed by the pilot upon the operation of the light 62.

From the above description it will be seen that upon the pilot becoming aware that the airplane is disabled or is likely to become disabled, it is only necessary that he operate the lever 49 which will effect the release of the latch mechanism 51 and the disengagement of the dog 59 with the ratchet 58. Thereupon the springs 14 will cause the immediate opening of the doors 6 and 7 and the springs 46 in the housing 44 will be permitted to expand and cause the frame composed of the prongs 26 to pivot forwardly, whereupon latch mechanism 30 and 31 will securely hold the frame in this position. During the initial movement of the frame, and due to the arrangement of the packing of the parachute 11 within the compartment 5, the withdrawal or movement of the cables 48 with the frame will result in the presentation of a portion of the inside of the parachute to the air pressure caused by the movement of the airplane. The air pressure tends to dislodge the parachute from its compartment and the greater presentation of the undersurface of the parachute due to the wind pressure will result in the rapid unfolding and dislodgment of the parachute until it assumes the position illustrated in Fig. 3. It will be clearly seen that the securing of the pivot frame formed of prongs 26 in the forward position will result in a suspension of the airplane from the forward as well as the rear position thereof, and the arrangement of the outrigging will result in the relatively wide suspending area along the sides of the airplane, so that the weight of the airplane is equally distributed and a retarded descent of the disabled airplane will result with the airplane being lowered to the ground while being maintained in its normal horizontal position.

What I claim is:

1. A safety mechanism for aircraft comprising a parachute, a compartment in the fuselage thereof in which the parachute is normally retained in inoperative position, and pivoted means arranged adjacent the forward portion of the aircraft and secured thereto, said pivoted means adapted to be moved through an arc of approximately 180° for effecting the subjection of the forward under portion only of the parachute to air currents upon the forward pivotal movement of said means, a subjection of the portion only of the parachute to air currents resulting in the subsequent total release of the parachute to operative position and the front portion of said aircraft being supported by the parachute through said pivot means.

2. A safety mechanism for aircraft comprising a parachute, means for normally maintaining the parachute in inoperative position, pivoted means secured to the aircraft adjacent the forward portion thereof for effecting the subjection of the under portion of the parachute to air currents upon the forward pivotal movement of said means, the pivoted means being normally maintained in the rearward position but being biased toward the forward position, and latch mechanism for maintaining the pivoted member in the forward position upon being permitted to assume such position, the subjection of the portion of the parachute to air currents resulting in the total releasing of the parachute to operative position.

3. A safety mechanism for aircraft comprising a parachute, means for normally maintaining the parachute in inoperative position, a plurality of arms pivoted to the aircraft and adapted to move in unison in a forward direction, and latch mechanism for maintaining the pivoted arms in the forward position upon being permitted to assume such position, said parachute having means connected to the free end of the pivoted arms and the parachute being folded so that the pivoting of the arms will effect the movement of said connecting means with the resultant subjection of a portion of the parachute to air currents for dislodging the same and rendering it operative.

4. A safety mechanism for aircraft comprising a parachute, a compartment for containing the parachute in inoperative position, a plurality of arms pivoted to the aircraft and adapted to be moved in unison in a forward direction, and latch mechanism for maintaining the pivoted arms in the forward position upon the same being permitted to assume such position, said parachute having means connected to the free end of the pivoted arms and the parachute being folded so that the pivoting of the arms will effect the movement of said connecting means with the resultant subjection of a portion of the parachute to air currents for dislodging the same and rendering it operative.

5. A safety mechanism for aircraft comprising a parachute, means for normally maintaining the parachute in inoperative position, a plurality of stationary arms fixed at a point remote from the forward end of the aircraft with the ends thereof extending forwardly and upwardly from the longitudinal center thereof to a point adjacent its forward end, a connecting support between the fuselage and the extending ends of the arms for maintaining the same rigidly in position, a plurality of arms pivoted to the aircraft adjacent the fixed ends of the stationary arms and adapted to swing from a rear position substantially parallel to the center of the aircraft to a forward position in close relation to and substantially in a plane with the fixed arms, said pivoted arms being adapted to be moved in unison and being normally retained in the rearward position while being biased toward the forward position, said parachute having means connected to the free end of the pivoted arms and the parachute being folded so that the pivoting of the arms toward the forward position will effect the movement of said connecting means with the resultant subjection of a portion of the parachute to the air currents for dislodging the same and rendering it operative.

6. A safety mechanism for aircraft comprising a parachute, means for normally maintaining the parachute in inoperative position, means connected to the parachute for dislodging a portion only thereof for subjecting the same to air currents, and members attached to the fuselage of the aircraft for suspending the major portion of the weight of the aircraft from the parachute when in operative position while the front portion of the aircraft is suspended by the dislodging means.

7. A safety mechanism for aircraft comprising a parachute, means for normally maintaining the parachute in inoperative position, means connected to the parachute for dislodging a portion only thereof in order to subject the same to air currents, members connected to a wing at a point spaced from the fuselage and to the tail of the aircraft, said members constituting the main attachment by which the parachute suspends the aircraft when in operative position, and mechanism associated with the means for dislodging a portion only of the parachute for maintaining said means in a position to effect a balanced distribution of the weight of the aircraft upon the parachute and thereby the even suspension of the aircraft upon the same.

8. A safety mechanism for aircraft comprising a parachute, a compartment for containing the parachute in inoperative position, means connected to the parachute for dislodging a portion only thereof in order to subject the same to air currents, members connected to a wing at a point spaced from the fuselage and to the tail of the aircraft, said members constituting the main attachment by which the parachute suspends the aircraft when in operative position, and mechanism associated with the means for dislodging a portion only of the parachute for maintaining said means after forward movement in a position to effect a balanced distribution of the weight of the aircraft upon the parachute and thereby the even suspension of the aircraft from the same.

9. A safety mechanism for aircraft comprising a parachute, a compartment for normally containing the parachute in inoperative position, cables for the parachute connected to pivoted means upon the aircraft for effecting dislodgment of a portion only of the parachute and the subjection thereof to air currents, members connected to a wing at a point spaced from the fuselage and to the tail of the aircraft, said members having a relatively large number of cables of the parachute attached therealong to cause the members to constitute the main attachment by which the parachute suspends the aircraft when in operative position, and mechanism associated with the pivoted means for effecting a dislodgment of a portion only of the parachute for maintaining said means after forward movement in a position to effect a balanced distribution of the weight of the aircraft upon the parachute and thereby the even suspension of the aircraft from the same.

10. A safety mechanism for aircraft comprising a parachute, a compartment arranged along the rear upper portion of the fuselage of the aircraft in which the parachute is normally contained in inoperative position, means connected to the parachute for dislodging a portion thereof in order to subject the same to air currents, members connected to a wing at a point spaced from the fuselage and to the tail of the aircraft, said members constituting the main attachment by which the parachute suspends the aircraft when in operative position, longitudinally arranged doors normally maintained in closed position for the compartment pivoted along the longitudinal edges thereof with their free ends having portions abutting substantially along the longitudinal center of the aircraft, spring means normally biasing the doors toward open position, and mechanism associated with the means for dislodging a portion of the parachute for maintaining said means after forward movement in a position to effect a balanced distribution of the weight of the aircraft upon the parachute and thereby the even suspension of the aircraft from the same.

11. A safety mechanism for aircraft comprising a parachute, a compartment normally containing the parachute in inoperative position, doors for the compartment normally maintained closed, spring means normally biasing the doors toward open position, a series of pivoted arms adapted to be moved from a position over the fuselage of the aircraft at a point adjacent the compartment to a forward position in which the free ends thereof are adjacent the forward end of the same, automatic latch mechanism for maintaining the arms in the forward position when permitted to assume such position, spring mechanism biasing the arms in the direction of the forward position, retaining mechanism normally maintaining the arms in the rear position, latch mechanism for normally maintaining the doors of the compartment in the closed position, common mechanism under the control of the pilot for rendering the retaining mechanism for the arms inoperative to permit the forward movement thereof and for releasing the doors of the compartment to permit the opening thereof, and means extending along the fuselage to which cables of the parachute are attached for constituting the main attachment by which the parachute suspends the aircraft, while other cables of the parachute are attached to the free ends of the arms to effect the dislodgment of a portion of the parachute and the subjection thereof to air currents upon the forward movement of the arms, whereby a balanced distribution of the weight of the aircraft upon the parachute is had with the even suspension of the aircraft from the same.

12. A safety mechanism for aircraft comprising a parachute, a compartment formed therein in which the parachute is normally retained in inoperative position and mechanical means including a pivoted member arranged on the forward portion of the aircraft and secured thereto, said pivoted member being adapted to be moved through an arc of approximately 180° for dislodging only a portion of the parachute for the subjection of that portion of the parachute to air currents for the purpose of subsequently dislodging the complete parachute and rendering it operative.

In testimony whereof I affix my signature.
GEORGE J. REGAS.